United States Patent [19]

Lavene

[11] Patent Number: 4,685,026
[45] Date of Patent: Aug. 4, 1987

[54] CAPACITOR FORMING AND MANUFACTURING METHOD

[75] Inventor: Bernard Lavene, Ocean, N.J.

[73] Assignee: Electronic Concepts, Inc., Eatontown, N.J.

[21] Appl. No.: 727,030

[22] Filed: Apr. 25, 1985

[51] Int. Cl.⁴ .......................... H01G 1/13; H01G 7/00
[52] U.S. Cl. .................................... 361/308; 29/25.42
[58] Field of Search ............... 361/306, 308, 309, 310, 361/323; 29/25.42

[56] References Cited

U.S. PATENT DOCUMENTS

| | | | |
|---|---|---|---|
| 923,889 | 6/1909 | Pruessman | 29/25.42 X |
| 1,237,015 | 8/1917 | Brinton | 29/25.42 X |
| 1,580,057 | 4/1926 | Lewis | 29/25.42 |
| 3,150,300 | 9/1964 | Schils et al. | 361/308 |
| 3,274,663 | 9/1966 | Bonenfant et al. | 29/25.42 |
| 3,458,783 | 7/1969 | Rosenberg | 361/308 |
| 3,665,267 | 5/1972 | Acello | 361/309 |
| 3,818,118 | 6/1974 | Bennett et al. | 361/308 X |
| 4,242,717 | 12/1980 | Saban | 361/308 |
| 4,378,620 | 4/1983 | Lavene | 29/25.42 |
| 4,455,591 | 6/1984 | Lavene | 361/310 |

*Primary Examiner*—Donald A. Griffin
*Attorney, Agent, or Firm*—Ratner & Prestia

[57] ABSTRACT

An improved metallized wrapped capacitor pressed into a predetermined cross-sectional form substantially without edge radii, together with its method of manufacture are disclosed. The capacitor is formed from elongated mated dielectric webs, each having an electrode deposited on its face. The webs are superposed and rolled into a coil having concentric turns. The coil is pressed into a mold to derive a cross-section that mates with electrically conductive end caps. The end caps are affixed physically and electrically at each end of the formed capacitor element. The entire assembly with the exception of portions of the end caps are subjected to vacuum impregnation of epoxy resin to provide physical strength and to provide environmental protection. A form of coil mold is described.

5 Claims, 12 Drawing Figures

PRIOR ART METHOD

PRIOR ART METHOD

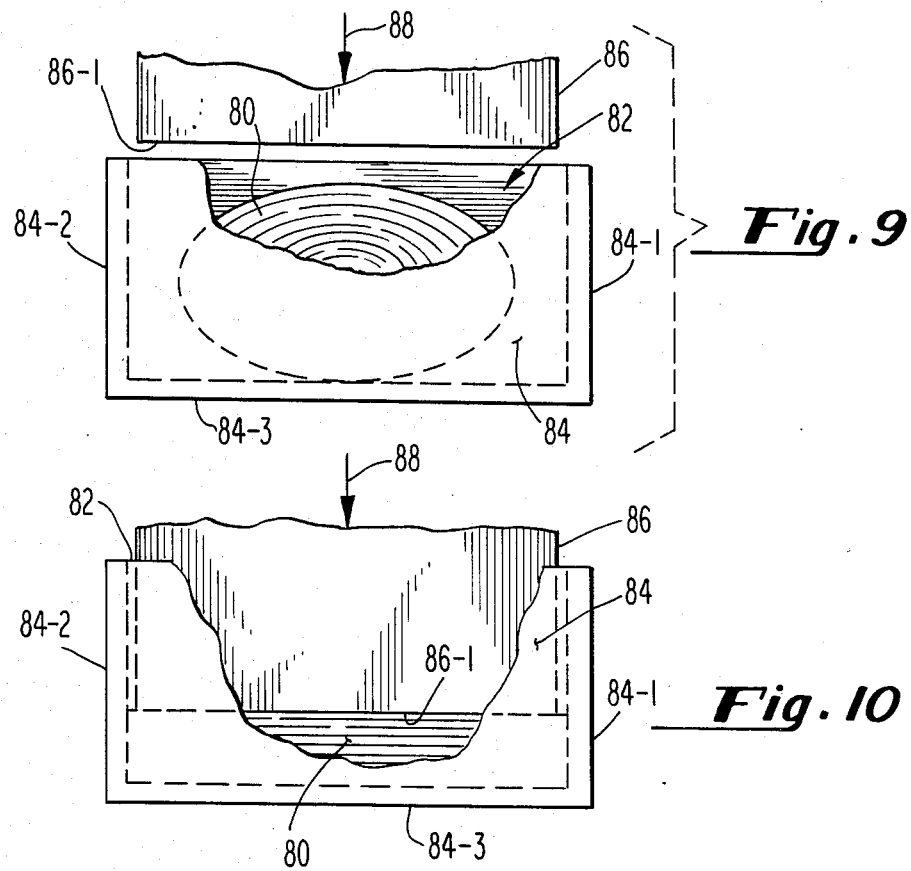
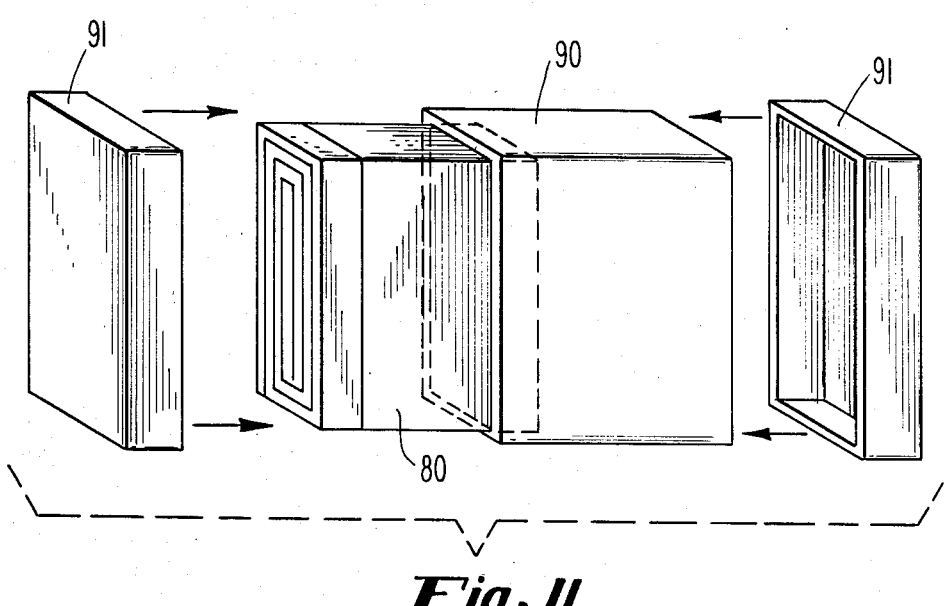

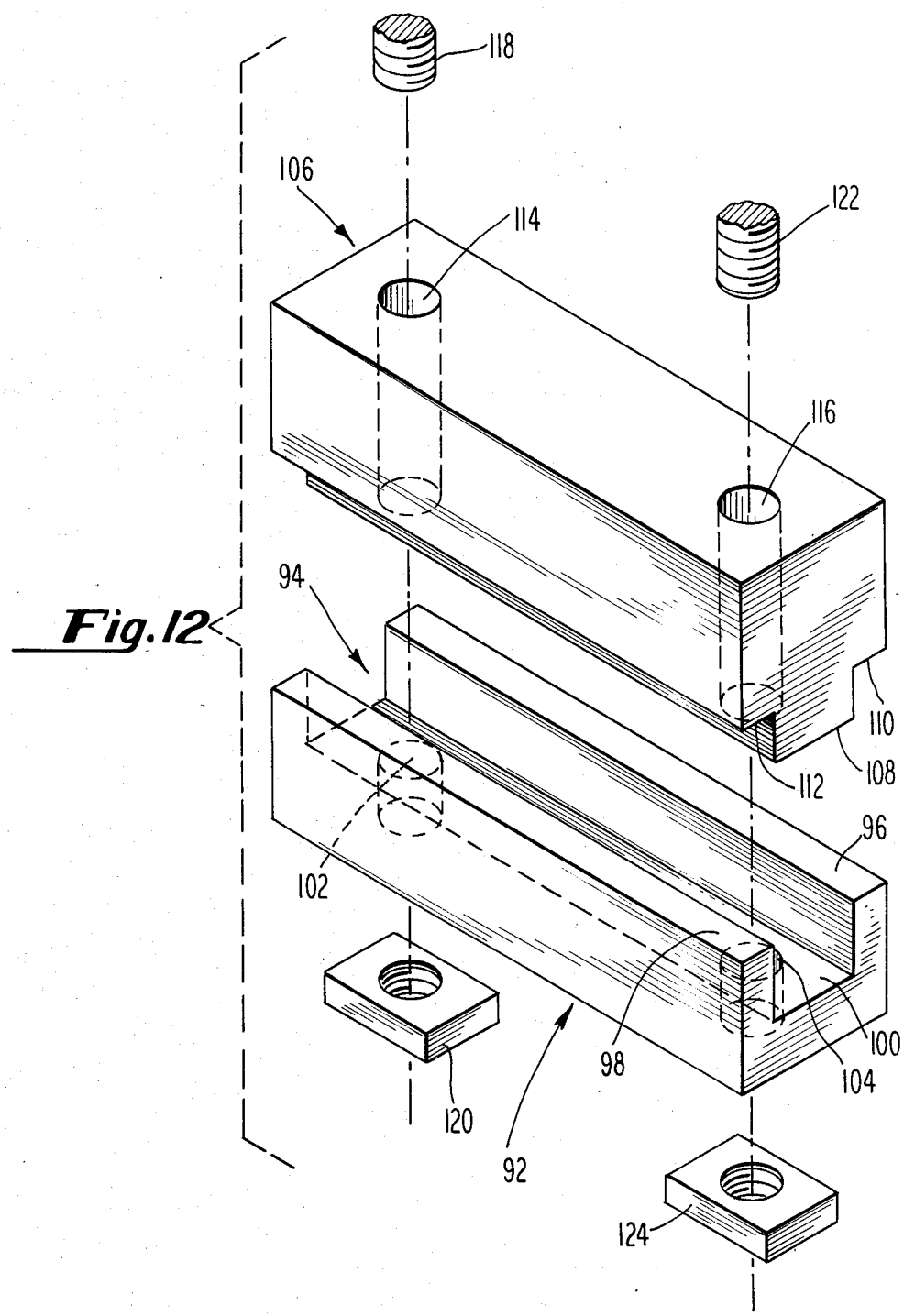

CAPACITOR FORMING AND MANUFACTURING METHOD

BACKGROUND OF THE INVENTION

1. Field of the Invention

This invention relates to manufacture of capacitors. More particularly, it relates to an improved method for forming capacitor elements for incorporation in a capacitor housing by pressing the capacitor element into a form.

2. State of the Prior Art

It is known in the prior art to fabricate wound film capacitors from strips or webs of dielectric material having electrically conductive material formed thereon and formed with a tight coil. Characteristically two or more such webs are wound together with dielectric material between the electrically conductive layers so that the electrodes thus formed are insulated from each other. Various types of materials, forms of encapsulations, and means for coupling terminals to the electrodes have been utilized.

Another capacitor structure and method of their manufacture involves the so-called chip capacitors. These are described in detail by Lavene in U.S. Pat. No. 4,378,620, which is herein incorporated by reference. In summary he describes fabricating small capacitors from a mated pair of dielectric webs having a plurality of electrically conductive spaced-apart electrodes formed thereon. The webs are aligned such that an electrode on one layer is juxtaposed a non-conductive portion of the web on the other layer in a manner such that the electrodes are off-set on the layers and to not lie one above the other. The webs are then wound, and the electrodes and dielectric material are bonded by applying pressure to the coil. Individual capacitors are then formed by chopping the coil into lengths. The layers of conductive material are electrically interconnected at each end, as by metal plating, and terminals are attached thereto. The assembly can be encapsulated or placed in a suitable housing to form the completed capacitor.

Due to the methods used to flatten and bond the coils in the prior art, the capacitors did not have precise forms, and required housings to be of a sufficiently large size to accommodate the capacitor elements. This was true for both discrete wound capacitors and chip capacitors. The additional size of the housing is undesirable for components to be used on printed circuit boards. Further, the irregular shapes create problems in automated assembly systems, and cause problems for environmental sealing.

It has been recognized that capacitors that are encapsulated and permit planar mounting to supporting assemblies are desirable. Such a device was described in co-pending Application Ser. No. 586,014 filed Mar. 5, 1984 and now Pat. No. 4,538,205. There is described a housing of a length somewhat longer than the capacitor element, forming a cavity at each end when the capacitor element is inserted. Conductive material is placed in the cavities for contacting respective electrodes, and end caps are fitted over each end. The end caps make electrical contact and are shaped for permitting surface mounting. An irregular shape of the capacitor element can cause problems of automated handling for insertion in the housing.

An object of the invention is to form capacitors by pressing capacitor elements constructed of interleaved layers of electrically conductive material and dielectric material into a form selected to match the interior shape of an associated housing. The capacitor component is less expensive to fabricate, and has an improved volumetric efficiency.

SUMMARY OF THE INVENTION

The invention comprises an improved capacitor component assembly and the method of manufacture. A metallized wrapped capacitor element of elongated mated dielectric webs, each having electrically conductive material on at least a part thereof, is formed by wrapping the mated dielectric webs into a coil of concentric turns, with the electrically conductive material on each web electrically insulated from that on the other web. The coil is formed such that conductive material for forming one plate of the capacitor is exposed at one end and conductive material for forming the other plate of the capacitor is exposed at the other end. The coil is formed to eliminate edge radii in a mold having a predetermined width, by pressure being applied to the coil and causing it to conform to the shape of the mold. The shape is selected to match end caps, one of which is placed over each end of the formed capacitor element, and each end cap is electrically connected to the associated capacitor conductors. The entire assembly is treated to provide physical strength and to provide moisture protection by vacuum impregnation with epoxy resin.

BRIEF DESCRIPTION OF THE DRAWINGS

The stated objectives of the invention and other more detailed objectives will be understood from a consideration of the Detailed Description of the Preferred Embodiment when considered with Drawings, in which:

FIG. 9 is a side view of a capacitor element mold having a portion broken away to illustrate the wound capacitor prior to compression and forming;

FIG. 10 is a side view of the capacitor element mold of FIG. 9, having a portion broken away to illustrate the capacitor element after compression and forming;

FIG. 11 is a pictorial view showing the capacitor element formed according to the present invention being formed into a novel capacitor component; and FIG. 12 is an exploded perspective view of a mold structure that can be utilized to form capacitor elements in accordance with the present invention.

DETAILED DESCRIPTION OF THE PREFERRED EMBODIMENT

Figure 1:
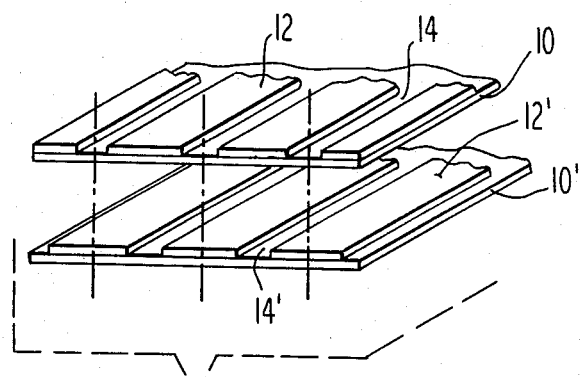
FIG. 1 is an exploded isometric view of two mated dielectric webs having electrically conductive elements deposited thereon.

FIG. 1 is an exploded isometric view of two mated dielectric webs having electrically conductive elements deposited thereon. The structure is described in detail by Lavene in the above-mentioned U.S. Pat. No. 4,378,620, but in general wound capacitor elements can be formed by positioning a pair of dielectric webs 10 and 10', each having a plurality of thin parallel metallic electrodes 12 and 12' deposited thereon, one above the other with the centerlines of the electrodes 12 and 12' off-set. The electrodes 12 and 12' are separated on the respective webs 10 and 10' by a spacing 14 and 14', such that each conductor on each web can be either above or below an associated spacing. The ratio of electrode 12 and 12' to spacing 14 and 14' is selected according to the capacitance desired.

Figure 2:
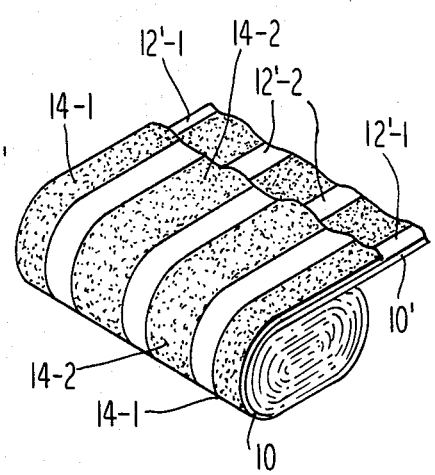
FIG. 2 is an isometric view showing the coil formed by winding the two mated webs of FIG. 1 together.

FIG. 2 is an isometric view showing the coil formed by winding the two mated webs of FIG. 1 together. The webs 10 and 10' are wound in concentric coils. The metallic strips 12'-1 at each edge are about one-half the width of strips 12'-2 to accommodate chopping. Similarly, spacings 14-1 are about one-half spacings 14-2.

Figure 3:
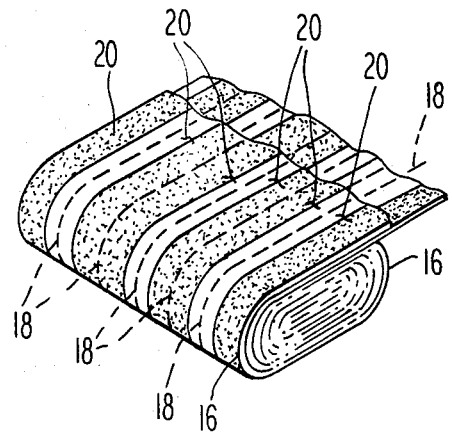
FIG. 3 is an isometric view of the coil of FIG. 2 after having been pressed and tempered to form bonded capacitor elements suitable for chopping to form chip capacitor elements.

FIG. 3 is an isometric view of the coil of FIG. 2 after having been pressed and tempered to form bonded capacitor elements suitable for chopping to form chip capacitor elements. The pressing and bonding cause the flattened coil to have rounded ends 16. Chopping is accomplished by causing a chopping element (not shown) to pass through the coil at dashed lines 18, thereby resulting in the individual capacitor elements 20 being formed, each having a conductive coil exposed at each end thereof as described in U.S. Pat. No. 4,378,620. It is the minimization of the rounding of rounded ends 16 to which the invention is directed.

Figure 5:
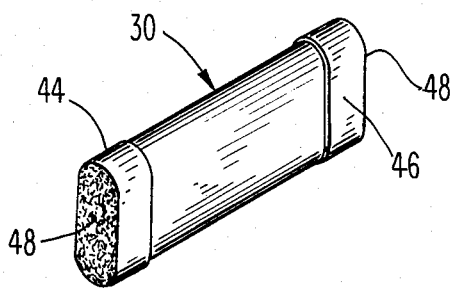
FIG. 5 is a perspective view of a finished wound capacitor adapted for surface mounting.
Figure 4:
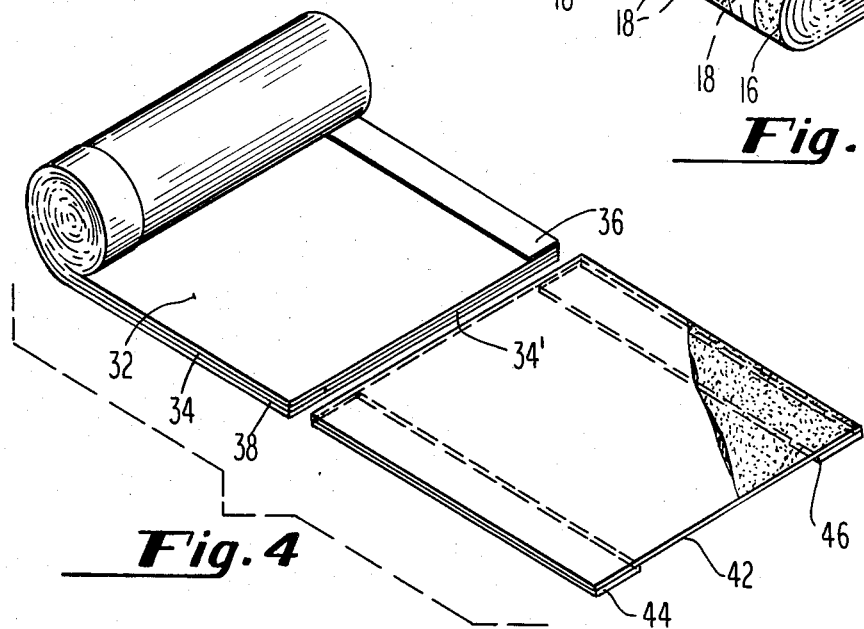
FIG. 4 is a diagrammatic view illustrating a wrapping for a wound capacitor.

Other forms of wound capacitors adapted for surface mounting are known, and one is illustrated in FIG. 4 and FIG. 5. This type of capacitor is described in detail in Applicant's co-pending application Ser. No. 513,271 filed July 17, 1983 now U.S. Pat. No. 4,516,187 and in U.S. Pat. No. 4,470,097, issued Sept. 4, 1984, to B. Lavene, entitled "Dual Film Metallized Capacitor" which is assigned to the assignee herein. This patent is incorporated herewith by reference.

FIG. 4 is a diagrammatic view illustrating wrapping of a wound capacitor, and FIG. 5 is a perspective view of a finished capacitor adapted for surface mounting. The capacitor 30 is formed from winding a first dielectric web 32 having an electrode 36 on the surface opposite that of the connective electrode 34, on a mating but reversed web 38 which has a conductive layer 34'. The arrangement is such that the narrow metallic layers 36 and 34 are arranged for contacting alternating coils of capacitor conductors.

The outer wrapping dielectric web 42 has a pair of narrow conductors 44 and 46, and when wound around the mated coil of webs 32 and 38, forms a protective sleeve with electrodes 44 and 46 exposed around the outer periphery. The wrapped coil is then pressed and tempered to cause bonding of the capacitor elements. The flattened coil has rounded edges as shown in FIG. 5. The ends 48 are coated or sprayed with conductive material forming the electrical connection of the associated metallic layers on webs 32 and 38.

Figure 6:
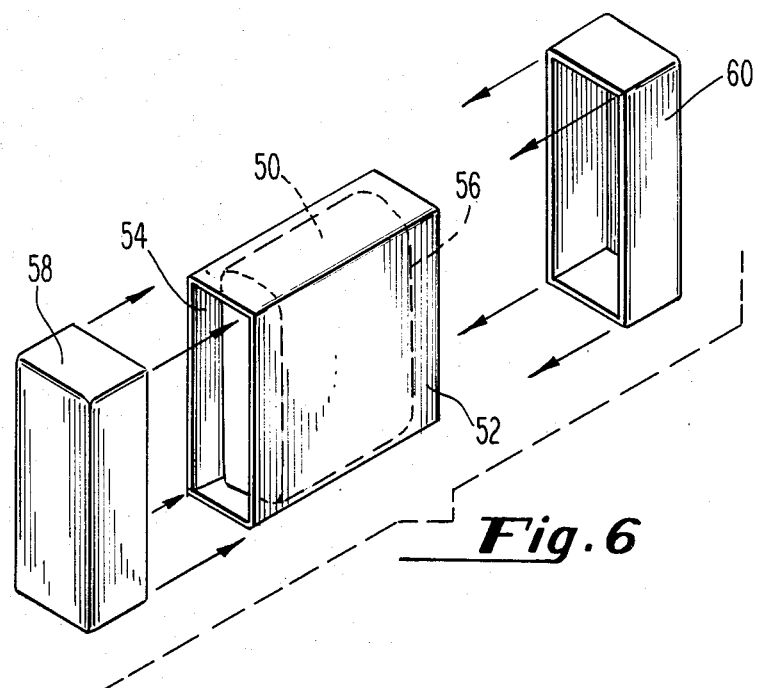
FIG. 6 is an exploded perspective view of a wound capacitor terminated for planar mounting, utilizing a would capacitor element formed by prior art methods.

FIG. 6 is an exploded perspective view of a wound capacitor terminated for planar mounting, utilizing a wound capacitor element formed by prior art methods. A structure of this type is described in detail by Lavene in co-pending application Ser. No. 586,014 now U.S. Pat. No. 4,538,205. A wound capacitor element 50, formed for example as described above, and having the rounded edges, is slipped into a sleeve 52. The sleeve is made of dielectric material and is longer than the capacitor element 50, thereby leaving cavities 54 and 56 at the ends. The ends of the capacitor element 50 are treated with conductive material to form the basis of making the electrical connection thereto. The cavities 54 and 56 are then filled with an electrically conductive material, such as paste, and conductive end caps 58 and 60 are slipped over respective ends of sleeve 52. The end caps 58 and 60 contact the conductive paste and thereby form terminals for surface mounting to an electrical assembly.

It is apparent that the rounded edges of capacitor element 50 require that the size of the sleeve 52 and end caps 58 and 60 be larger than would be required if capacitor element 50 matched exactly the inner dimensions of sleeve 52.

Figure 7:
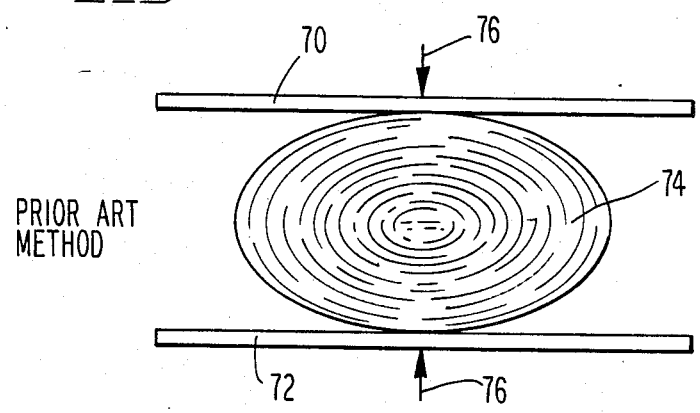
FIG. 7 illustrates a prior art system of pressing wound capacitors with the press open.
Figure 8:
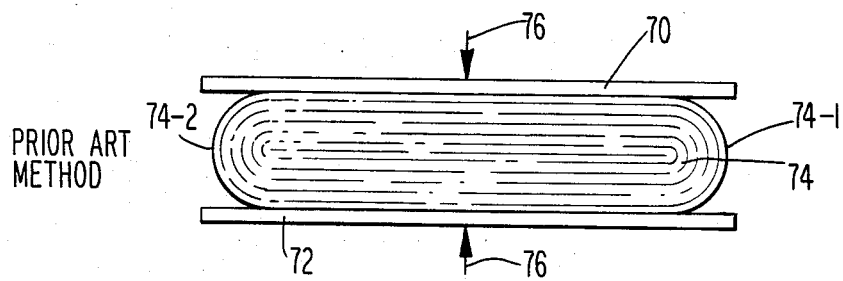
FIG. 8 illustrates a prior art system of pressing wound capacitors with the press closed, and illustrates the radius at each edge of the capacitor.

The prior art method of pressing and forming wound capacitor elements is illustrated in FIG. 7 and FIG. 8. FIG. 7 illustrates the prior art system of pressing wound capacitors with the press open. Essentially a pair of press plates 70 and 72 are positioned on each side of the wound capacitor element 74. Pressure was then applied in the direction of arrows 76, causing the press plates 70 and 72 to move toward each other.

FIG. 8 illustrates a prior art system of pressing wound capacitors with the press closed, and illustrates the radius at each edge of the capacitor. The press plates 70 and 72 have been forced in the direction of arrows 76 to a point where the capacitor element 74 has been formed to the desired thickness. There remains the radius at each edge 74-1 and 74-2 that causes the problems mentioned above. Once formed, the capacitor element is treated, as by the application of heat, to cause the entire wound assembly to become physically bonded, and the balance of the assembly steps can be completed.

To alleviate the form problem encountered in the prior art, and to maximize generation of a consistent form factor particularly adapted to robotic handling, the forming process has been improved by providing a predetermined capacitor mold for use in the forming process. The improved forming process is illustrated in FIG. 9 and FIG. 10.

FIG. 9 is a side view of a capacitor element mold having a portion broken away to illustrate the wound capacitor prior to compression and forming. The capacitor element 80 within the mold is preferably a wound chopped capacitor element such as capacitor elements 20 formed from the coil of FIG. 3. Element 80 is positioned within a predetermined cavity 82 in the capacitor element mold 84. The mold 84 has end members 84-1 and 84-2 for limiting the outward movement of any portion of capacitor element 80. The mold 84 also has a bottom 84-3 connecting ends 84-1 and 84-2 together and providing a surface against which capacitor element 80 can be pressed. A press member 86 has a dimension to fit between ends 84-1 and 84-2, and has a surface 86-1 for contacting the capacitor element 80 when the press member 86 is moved in the direction of arrow 88.

FIG. 10 is a side view of the capacitor element mold of FIG. 9 having a portion broken away to illustrate the capacitor element after compression and forming. The press member 86 has been moved a predetermined distance in the direction of arrow 88 within cavity 82 to force capacitor element 80 to be flattened and forced against mold ends 84-1 and 84-2. As thus formed, capacitor element 80 is devoid of the objectionable radii at the edges, as encountered in the prior art. After pressing, the capacitor element may be treated to cause it to become a fixed unitary element. It is subjected to such other steps as are required to form the desired type of packaged capacitor component.

FIG. 11 is a pictorial view showing the capacitor element formed according to the present invention being formed into a novel capacitor. After forming as described above, capacitor element 80 can be slipped into sleeve 90 in a manner similar to that described with respect to FIG. 6. In this arrangement sleeve 90 can be of a smaller size to accommodate the closely controlled dimensions of the capacitor element 80. Caps 91 can be used without sleeve 90.

FIG. 12 is an exploded view of a mold structure that can be utilized to form capacitor elements in accordance with the present invention. A mold base 92 has a predetermined length, and mold channel 94 formed by walls 96 and 98 and bearing surface 100. The channel 94 is the functional equivalent of cavity 82 in FIGS. 9 and 10. The mold base 92 has a pair of apertures 102 and 104 extending at least part way therethrough, and arranged near each end thereof, and centered on the centerline of bearing surface 100.

The mold press 106 is substantially the same length as mold base 92, and has a press member 108 that mates closely with channel 94 at the walls 96 and 98. The height of press member 108 is less than the depth of channel 94, it being arranged such that the movement of press member 108 into channel 94 will be limited when stop surfaces 110 and 112 come into contact with the respective upper surfaces of walls 98 and 96.

The mold press 106 has apertures 114 and 116 therethrough, and in axial alignment with associated ones of apertures 102 and 104. Threaded bolt 118 is passed through apertures 114 and 102 to cooperate with nut 120. Similarly, bolt 122 is passed through apertures 116 and 104 to cooperate with nut 124.

When a wound capacitor is positioned in channel 94 and nuts 120 and 124 are tightened, mold press 106 is forced toward mold base 92, and press member 108 causes it to be forced into conformity with channel 94. It is apparent that this form of mold is illustrative only and that the configuration and mechanics of operation can be varied to suit the needs of the individual cases. Similarly, the mold structure can be multiplied as desired to allow forming of multiple capacitor elements in a single forming step.

The length of channel is not critical, it only being required that the capacitor element be narrower than the distance between bolts 118 and 122. For many types of small capacitors, some of which are no longer than 21 millimeters, it has been found to be advantageous to provide a mold long enough to press several capacitor elements simultaneously in the channel.

As indicated above in the consideration of FIG. 11, an improved capacitor component can be achieved with the forming process described and the use of the end caps 91. With the insulating outer layer on the capacitor element 80, and the conductive bands at the ends, it is dusted as described in the co-pending applications, and the end caps 91 are put in place and electrically connected, as by use of epoxy silver, to the capacitor element. At this point a completed capacitor component has been described. If it is desirable to provide moisture protection, the completed assembly can be subjected to epoxy impregnation under vacuum impregnation processes, of a type that is known.

The elimination of the sleeve 90, and the use of end caps 91 as just described, allow the capacitor element 80 to have additional turns for the same volume of finished capacitor component, thereby allowing for additional capacitance in the same volume. The component thus formed is less expensive, but somewhat less sealed, and provides the additional volumetric efficiency mentioned.

The use of the vacuum impregnation with an epoxy resin provides additional mechanical strength to the assembly, and allows the component to withstand temperature variations that are encountered in various solder processes in assembly of printed circuit board assemblies on which these capacitor components are frequently used. During the vacuum impregnation process, the end caps are protected, for example, by masking off with a silicon adhesive polypropylene tape, that keeps the epoxy off the contact surfaces. Once the impregnation is completed, the tape is removed, and the component can be readily put in the manufacturing process for the circuits in which the capacitors will be used.

From the foregoing descriptions of the preferred embodiment, the stated purposes and objectives have been met. It is understood that the particular embodiments shown and described are preferred, and that various modifications and alternatives will become apparent to those skilled in the art without departing from the spirit and scope of the invention. Accordingly, what is intended to be protected by Letters Patent is set forth in the appended claims.

I claim:

1. A method of fabricating substantially small sized rectangular cross-section wound capacitors comprising plating a plurality of continuous regularly spaced metallic electrodes on one side of each of a pair of dielectric plastic webs, said electrodes being parallel to the web and further the electrodes being separated from each other forming a plurality of regularly spaced unplated lengthwise directed openings;

(a) arranging the plated on electrodes of the webs so that in each pair of webs at least one has a plated electrode lying along one edge and the other has an open area lying along one edge;

(b) mating said pair of webs so that the unplated side of a first of the webs is in physical contact with the plated no bracket electrode of a second web and further arranged so that the plated edge of one web lies over the unplated edge of the other web so that the remainder of the plated electrodes in each web are in a staggered and overlapping arrangement relative to each other, such that substantially the same portion of the remaining plated electrodes on one pair of webs will fall over the remaining open spaces in said webs;

(c) winding a length of said mated webs to form a layered coil to form an alternating arrangement of continuous plated electrodes spaced from layer to layer along the outer edges of said coil as it is wound;

(d) chopping the coil to provide a clear cut through the alternating open spaces and plated electrodes in the webs such that at the chopped edges for every layer there is an arrangement in which a plated electrode is at one edge and an open space at the other, alternating from one layer to the next thereby forming a plurality of capacitor elements;

(e) providing a mold for defining a rectangular capacitor element cross-section;

(f) placing at least one capacitor element in said mold;

(g) applying pressure to said capacitor element to cause it to be pressed into said mold for causing said capacitor element to be formed with said rectangular cross-section;

(h) inserting the capacitor element into a nonconductive sleeve wherein the ends of the sleeve extend substantially beyond the ends of the capacitor element forming cavities at each end of the sleeve;

(i) substantially filling the cavities with a conductive substance electrically coupled to respective turns of the electrode at each end of the capacitor element;

(j) positioning rectangular metal end caps at opposite ends of the sleeve and substantially enclosing the cavities and engaging and electrically coupling the end caps to the conductive substance.

2. The method of claim 1 wherein the electrically substance means is selected to be epoxy silver paste for providing mechanical interconnection in addition to electrical interconnection.

3. The method of claim 2 further comprising the step of applying a coating on the entire assembly except predetermined portions of the electrical terminals for providing moisture protection.

4. The method of claim 3 wherein the step of applying the coating includes the step of vacuum impregnating epoxy resin.

5. The method of claim 1 in which step (g) comprises the step of applying pressure to a plurality of compacitor elements simultaneously.

* * * * *